Patented Oct. 18, 1927.

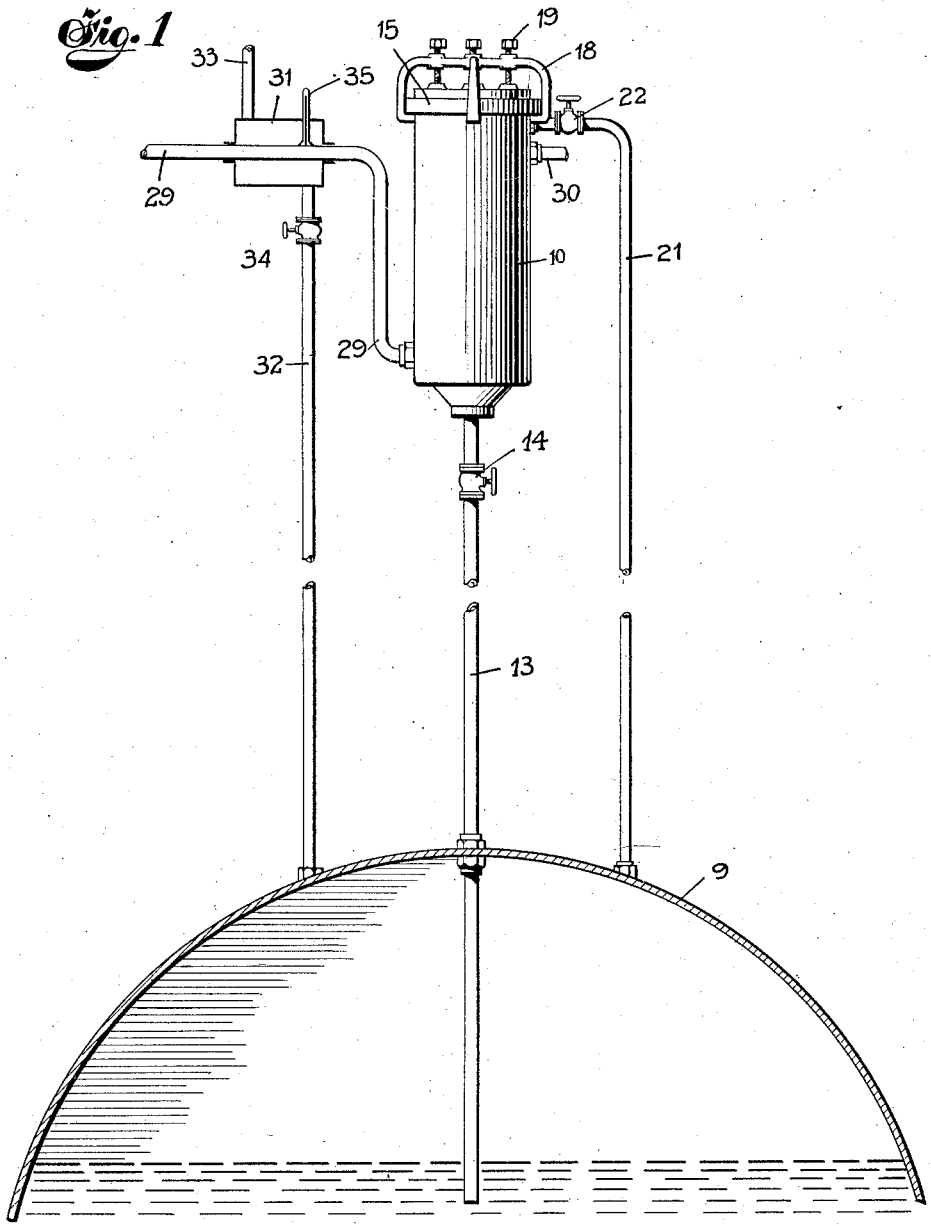

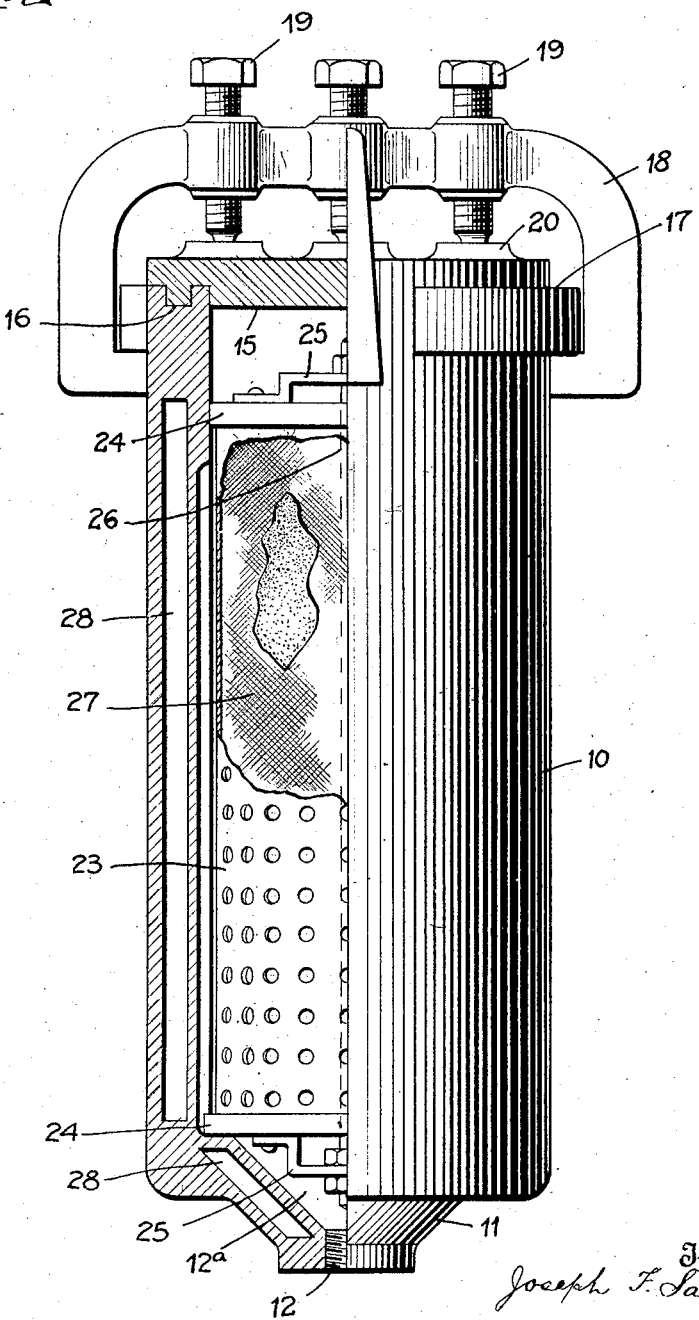

1,645,973

UNITED STATES PATENT OFFICE.

JOSEPH F. SANFTLEBEN, OF NEW YORK, N. Y., ASSIGNOR TO FILTRATORS COMPANY, INCORPORATED, OF NEW YORK, N. Y., A CORPORATION OF NEW YORK.

APPARATUS FOR USE IN PREVENTING THE INCRUSTATION OF STEAM BOILERS.

Application filed September 18, 1923. Serial No. 663,460.

My invention relates to an improvement in apparatus for use in preventing the incrustation of steam boilers and is intended for use in carrying out the method disclosed in application for Letters Patent of the United States No. 508,171, filed October 17, 1921, and as an improvement on the apparatus shown in application for Letters Patent of the United States No. 658,509, filed August 21, 1923.

In the method referred to in the above mentioned patent application, vegetable seeds are treated so as to form a mucilaginous emulsion which is injected into the boiler water and which acts to prevent incrustation on the walls of the boiler and to remove the scale or incrustations which may have previously been formed there. The vegetable seeds are sometimes mixed with soda or starch or both, but so far as this particular invention is concerned the materials used as a scale remover and preventive is not important. It has been found desirable, however, to steep the materials used as a scale preventer and at such temperature that a mucilagenous emulsion will be formed but the material should not be cooked "too hard" or heated to such an extent as to free the oily substances therein.

My invention is to facilitate the above result and I provide means for cooling the container of the scale preventive and furthermore I provide means for regulating the temperature so that it may be maintained at a desirable point. I have also found that it is more convenient to introduce the material from which the emulsion or solvent is formed in a porous bag or receptacle through which the water of condensation or other steeping water will pass freely as this enables the proper mixture to be supplied to the boiler. It also leaves the residuums in the porous container so that it can be easily removed. It will be seen, however, that the receptacle for containing the seeds, etc., may conveniently be textile and that the apparatus for holding such a receptacle may be varied almost indefinitely without affecting the invention, all of which, and further advantages, will be better understood from the description which follows.

References to be had to the accompanying drawings in which similar reference characters refer to similar parts throughout the several views.

Fig. 1 is a broken sectional elevation of the apparatus as a whole as applied to a steam boiler, and Fig. 2 is an enlarged elevation partly in longitudinal section and partly broken of the steeping cylinder and connected parts.

The drawings are by way of example, and illustrate a preferred form of the apparatus. The cylindrical container 10 has preferably a reduced lower end 11 in which is a screw threaded opening 12 communicating with a chamber 12$^a$ in the lower part of the container 10 and adapted to receive the upper end of a pipe 13 which, when the container is supported above the boiler as in Fig. 1, extends downward through the boiler shell so as to discharge into the water of the boiler 9. Obviously, the boiler can be of any type. The pipe 13 should be provided with a valve 14 by which the flow of emulsion from the container 10 may be regulated. The container is provided with a suitable top cover 15 which may be of any suitable type and which as shown in Fig. 2 has an annular flange 16 near its edge entering a complimentary groove in the top wall of the container. The cover may be locked in place by any suitable means and as a means for securing the cover I have shown a flange or rib 17 on the exterior of the container 10 which is engaged by a yoke 18 and through the upper part of this are threaded bolts 19 which impinge on the parts 20 of the cover and thus the cover may be locked securely in place.

The upper part of the container 10 is connected by a pipe 21 with the boiler 9 through which boiler pressure steam may be admitted to the upper part of the container 10 and the pipe 21 is controlled by a suitable valve 22.

Within the container 10 and spaced from the inner wall thereof is a perforated shell 23 of cylindrical form which is closed at top and bottom by removable heads 24 and the shell is supported above the chamber 12$^a$. The heads are provided with handles 25 and are locked in place by a tie-rod 26. The shell 23 is like the corresponding part referred to in the prior application for U. S. patent mentioned above and it is adapted to receive a bag 27 containing the material from which the desired emulsion is made.

It will be noted that as this bag is porous the warm water in the container will steep the contents of the bag and form the emulsion as readily as if the material were loose in the shell 23. In this connection it will be seen that the means for supporting the bag containing the material to be treated or emulsified can be changed very readily without affecting the invention as the essential thing is to support such bag of material in a way to have it steeped and the emulsified or otherwise treated water returned to the boiler.

It is desirable to have the container 10 directly above the boiler 9 and in this position with the boiler pressure steam coming into it it is likely to become too hot and for this reason I have shown it with a water jacket having the customary space 28 in the wall through which cooling water may flow. Circulation through the water jacket is maintained by means of pipes 29 and 30 in the customary manner. In order that the temperature of the container may be more perfectly controlled the pipe 29 can be encased for a short distance in a steam jacket 31 which can be supplied with steam through a pipe 32 connecting with the boiler or other source of supply and the jacket is also provided with a return pipe 33. The pipe 32 is controlled by a valve 34 and a thermometer 35 may be inserted in the steam jacket 31 and connected to the water pipe 29 to indicate the water temperature and by observing the thermometer and regulating the flow of steam the temperature of water and consequently of the interior of the container 10 may be controlled.

The operation of the apparatus is similar to that described in the prior applications referred to. The material to be emulsified or to be otherwise treated so that the resulting water may flow into the boiler is steeped in the container 10 by reason of the water of condensation which accumulates in the container and the treated water passes into the boiler through the pipe 13. It will be noted that this invention provides therefore a better way of controlling the temperature of the container in which the materials are steeped and discloses a better way of handling the material which is steeped or emulsified.

What I claim is:

1. In combination, a steam boiler, a container for seeds containing a mucilaginous substance and oil, a pipe to admit steam to the container at the pressure of the boiler, a pipe connecting the lower part of the container with the boiler, and means whereby the interior of the container may be maintained at a predetermined temperature, irrespective of the temperature and pressure of the steam admitted to the container.

2. In combination, a steam boiler, a container for seeds containing a mucilaginous substance and oil, a pipe to admit steam to the container at the pressure of the boiler, a pipe connecting the lower part of the container with the boiler, and means, including a water jacket around the container, whereby the interior of the container may be maintained at a predetermined temperature, irrespective of the temperature and pressure of the steam admitted to the container.

3. In combination, a steam boiler, a container for seeds containing a mucilaginous substance and oil, a pipe to admit steam to the container at the pressure of the boiler, a pipe connecting the lower part of the container with the boiler, a water jacket around the container, an inlet and an outlet pipe therefor, and regulatable means for heating the water passing through the water jacket inlet pipe, whereby the interior of the jacket may be maintained at a predetermined temperature, irrespective of the temperature and pressure of the steam admitted to the container.

4. In combination, a steam boiler, a container for seeds containing a mucilaginous substance and oil, a pipe to admit steam to the container at the pressure of the boiler, a pipe connecting the lower part of the container with the boiler, a water jacket around the container, an inlet and an outlet pipe therefor, a steam jacket surrounding a portion of the water jacket inlet pipe, and a valved steam supply pipe for said steam jacket, whereby the interior of the jacket may be maintained at a predetermined temperature, irrespective of the temperature and pressure of the steam admitted to the container.

5. In combination, a container for seeds containing a mucilaginous substance and oil, a valved pipe to admit steam to the container, an outlet pipe connected to the lower part of the container, and means whereby the interior of the container may be maintained at a predetermined temperature, irrespective of the temperature and pressure of the steam admitted to the container.

6. In combination, a container for seeds containing a mucilaginous substance and oil, a valved pipe to admit steam to the container, an outlet pipe connected to the lower part of the container, and means, including a water jacket around the container, whereby the interior of the container may be maintained at a predetermined temperature, irrespective of the temperature and pressure of the steam admitted to the container.

In testimony whereof, I have signed my name to this specification this fourteenth day of September, 1923.

JOSEPH F. SANFTLEBEN.